(12) United States Patent
Staelin et al.

(10) Patent No.: US 8,594,439 B2
(45) Date of Patent: Nov. 26, 2013

(54) IMAGE PROCESSING

(75) Inventors: Carl Staelin, Haifa (IL); Stephen Philip Cheatle, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 113 days.

(21) Appl. No.: 13/320,963

(22) PCT Filed: May 28, 2009

(86) PCT No.: PCT/US2009/045367
§ 371 (c)(1),
(2), (4) Date: Nov. 17, 2011

(87) PCT Pub. No.: WO2010/138121
PCT Pub. Date: Dec. 2, 2010

(65) Prior Publication Data
US 2012/0093402 A1    Apr. 19, 2012

(51) Int. Cl.
*G06K 9/62* (2006.01)
*G06K 9/00* (2006.01)

(52) U.S. Cl.
USPC .......................................... 382/224; 382/165

(58) Field of Classification Search
None
See application file for complete search history.

(56) References Cited

U.S. PATENT DOCUMENTS

| | | | | |
|---|---|---|---|---|
| 3,993,976 A * | 11/1976 | Ginsburg | ...................... | 382/211 |
| 5,721,711 A * | 2/1998 | Fine et al. | .......................... | 367/1 |
| 5,757,953 A * | 5/1998 | Jang | .............................. | 382/132 |
| 5,825,909 A * | 10/1998 | Jang | .............................. | 382/132 |
| 5,867,610 A * | 2/1999 | Lee | ................................ | 382/283 |
| 6,415,062 B1 * | 7/2002 | Moed et al. | ................... | 382/260 |
| 6,597,736 B1 * | 7/2003 | Fadel | ....................... | 375/240.01 |
| 2003/0103261 A1 * | 6/2003 | Hay | ............................... | 359/352 |
| 2003/0198367 A1 * | 10/2003 | Hartmann et al. | ............. | 382/118 |
| 2004/0239582 A1 * | 12/2004 | Seymour | ........................... | 345/5 |
| 2005/0012035 A1 * | 1/2005 | Miller | ............................ | 250/226 |
| 2005/0047656 A1 * | 3/2005 | Luo et al. | ....................... | 382/167 |
| 2005/0163378 A1 * | 7/2005 | Chen | ............................ | 382/190 |
| 2006/0284991 A1 * | 12/2006 | Ikeda | ........................... | 348/223.1 |

(Continued)

FOREIGN PATENT DOCUMENTS

| | | |
|---|---|---|
| JP | 2007243987 | 9/2007 |
| JP | 2009004895 | 1/2009 |

OTHER PUBLICATIONS

L Itti, C Koch, and E Niebur, A model of saliency-based visual attention for rapid scene analysis, IEEE Transactions on Pattern Analysis and Machine Intelligence, vol. 20, No. 11, Nov. 1998, pp. 1254-1259.*

(Continued)

*Primary Examiner* — Bhavesh Mehta
*Assistant Examiner* — Feng Niu (57) ABSTRACT

An electronic image processor (200) for enhancing an artistic intent of an image comprises: an input (210) to receive digital image data of an image to be enhanced; a classifier (220) to identify and classify regions in an image, including assigning to each region one of plural predetermined classifications and a respective degree of confidence in the classification, on the basis of the context of the region within the image, each classification being associated with a perceived degree of saliency of the region to a human viewer of the image; and an enhancer (250) to enhance regions of the image by a degree of enhancement determined at least in part by the respective classification and by the degree of confidence in the classification.

14 Claims, 7 Drawing Sheets

(56) References Cited

U.S. PATENT DOCUMENTS

| | | | | |
|---|---|---|---|---|
| 2007/0189615 | A1* | 8/2007 | Liu et al. | 382/232 |
| 2008/0068443 | A1* | 3/2008 | Thielman et al. | 348/14.1 |
| 2008/0084427 | A1* | 4/2008 | Delahunt et al. | 345/581 |
| 2008/0137977 | A1* | 6/2008 | Bertens et al. | 382/254 |
| 2008/0181507 | A1* | 7/2008 | Gope et al. | 382/190 |
| 2008/0219558 | A1 | 9/2008 | Lu et al. | |
| 2008/0284854 | A1* | 11/2008 | Thurston, III | 348/207.1 |
| 2008/0292193 | A1* | 11/2008 | Bigioi et al. | 382/203 |
| 2008/0298718 | A1* | 12/2008 | Liu et al. | 382/284 |
| 2010/0199227 | A1* | 8/2010 | Xiao et al. | 715/863 |
| 2010/0201921 | A1* | 8/2010 | Bell | 349/77 |
| 2010/0231721 | A1* | 9/2010 | Meloche et al. | 348/159 |

OTHER PUBLICATIONS

S. Su, F. Durand and M. Agrawala: De-emphasis of distracting image regions using texture power maps. In Texture 2005: Proceedings of the 4th International Workshop on Texture Analysis and Synthesis, pp. 119-124, 2005.*

Qu et al., Salient building detection in natural image using SVM, IEEE International Conference on Vehicular Electronics and Safety, Oct. 14-16, 2005, pp. 126-130.*

R. Achanta, F. Estrada, P. Wils, and S. S usstrunk, "Salient region detection and segmentation," in IEEE ICVS, 2008, pp. 66-75.*

Phil Cheatle. "A fast segmentation and saliency algorithm", Proceedings HP Imaging and Color Symposium, (Berkeley, CA, Jun. 17-20, 2008).

J. Collomosse and P. Hall, "Genetic Paint: A Search for Salient Paintings," EvoWorkshop 2005, in Applications of Evolutionary Computing, E. Rothlauf et al (Eds), Springer-Vertag Lecture Notes in Computer Science 3449 pp. 437-447, 2005.

Jun Xiao, Xuemei Zhang, Phil Cheatle, Yuli Gao, and C. Brian Atkins, "Mixed-Initiative Photo Collage Authoring", Proceedings ACM Multimedia, To appear Oct. 2008.

* cited by examiner

IMAGE PROCESSING

CROSS-REFERENCE TO RELATED APPLICATIONS

This application is a National Stage application of International Application No. PCT/US2009/045367, filed May 28, 2009, the disclosure of which are hereby incorporated by reference in its entirety.

FIELD

The present invention relates to image processing and, more particularly, to image enhancement, for example, to preserve or enhance artistic intent in an image.

BACKGROUND

It is known to enhance the technical characteristics of a digital image, for example a digital photograph, by removing technical faults introduced by a camera that took the photograph, or by modifying the technical characteristics of the image to make it more "pleasing" to the human eye. For example, it is known to adjust sharpness and contrast, and even modify certain colours, such as colours of the skin, grass or sky. Such adjustments can conveniently be automated and applied, for example, in an image processing pipeline for a commercial printing operation. However, not all apparent technical imperfections, such as fuzziness, are undesirable, and may even have been intended by a photographer. While an automated approach to image enhancement may improve apparent technical characteristics, it may also destroy artistic intent. More intelligent approaches to automated image enhancement are desirable.

SUMMARY

According to a first aspect, the present invention provides an electronic image processor for enhancing an artistic intent of an image, comprising: an input to receive digital image data of an image to be enhanced; a classifier to identify and classify regions in an image, including assigning to each region one of plural predetermined classifications and a respective degree of confidence in the classification, on the basis of the context of the region within the image, each classification being associated with a perceived degree of saliency of the region to a human viewer of the image; and an enhancer to enhance regions of the image by a degree of enhancement determined at least in part by the respective classification and by the degree of confidence in the classification.

According to a second aspect, the present invention provides a computerised method of enhancing an artistic intent of an image, the method comprising: receiving digital image data of an image; classifying identified regions of the image according to one of plural predetermined classifications and associated degrees of confidence in the classifications, on the basis of the context of the region within the image, each classification being associated with a perceived degree of saliency of the region to a human viewer of the image; and enhancing regions of the image by a degree of enhancement determined at least in part by the respective classification and by the degree of confidence in the classification.

Further aspects and embodiments of the invention will become apparent from the following description and claims.

BRIEF DESCRIPTION OF THE DRAWINGS

Various features and advantages of the invention will become apparent from the following description of embodiments of the invention, given by way of example only, which is made with reference to the accompanying drawings, of which.

DETAILED DESCRIPTION

Various embodiments of the present invention will now be described in more detail with reference to the accompanying drawings. It will be appreciated that the invention is not limited in its application to the details of the method and the arrangement of components as set forth in the following description or illustrated in the drawings. It will be apparent to a person skilled in the art that additional embodiments of the present invention not detailed in the description are possible and will fall within the scope of the present claims. Accordingly, the following description should not be interpreted as limiting in any way, and the scope of protection is defined solely by the claims appended hereto.

In general, embodiments of the present invention are aimed at enhancing digital images automatically, including by varying the kind or degree of enhancement applied to different regions of an image, by identifying and taking account of saliency (in other words, the degree to which regions are likely to be, or are perceived to be, of interest to a human viewer). For example, people (in very general terms) are inherently more interested in faces and (it has been found) in regions of high contrast: faces are therefore regions of high saliency. The present inventors have found that it is possible, and indeed desirable, to evaluate an image, and determine which regions thereof are most likely to be of interest to viewers, in order to determine how to apply automated image enhancement to the image. There are various known techniques in the published art of 'image understanding' that may be used, according to embodiments of the present invention, to evaluate and classify an image. Such techniques can, for example, be used to identify faces and people, for example as described in U.S. Pat. No. 7,133,571, the entire contents of which are hereby incorporated herein by reference. However, a new and advantageous technique for classifying, or segmenting, an image, will be described herein. While known techniques are typically capable of identifying and classifying 'subject' and 'background' regions of an image, the new technique herein introduces a further region classification called 'distraction'. A distraction can comprise various subject matter, even a face, if it is determined that it might attract attention but should be of less significance or interest (i.e. less salient) to a viewer of the image. The additional classification of distraction has various advantages. For example, it provides a more granular set of classifications (three rather than two according to the embodiment to be described herein) and means that different degrees of enhancement can be applied to images). According to the embodiment to be described, a "distraction" refers to image regions which undesirably attract human attention (and may be classified as "subject" by prior art saliency algorithms), but which are small and/or near the edge of an image. Such regions are likely to divert human attention from an intended subject of the image. The present inventors have appreciated that it is not desirable to enhance distraction regions in the same way as subject regions. As such, and according to an embodiment to be described, distraction regions may be treated (in terms of enhancement) as if they are background regions. In some embodiments, distraction regions may even be de-emphasised, for example by making them fuzzier than they were.

The classification of 'distraction' finds particularly beneficial application in automated processing of digital images captured by modern compact digital cameras. Compact digital cameras tend to use small imaging sensors and have a lens very close to the sensor (to provide compactness). This combination leads to resulting photographs having relatively high depth-of-field, which means it is difficult for a photographer to focus on a central subject while defocusing background and distraction subject matter. Embodiments of the present invention can determine a 'distraction' and thereby compensate for (and, indeed, remove the effects of) undesirably high depth-of-field, by defocusing the respective region(s).

Embodiments of the invention also advantageously apply more than one technique for classifying regions of the image (though, in other embodiments, one technique may be sufficient, or more than two may be advantageous), to increase the likelihood that the salient regions are emphasised. In an embodiment to be described, face detection and image segmentation techniques are both applied, and the results of each are combined to generate particularly accurate image classification.

Figure 1:
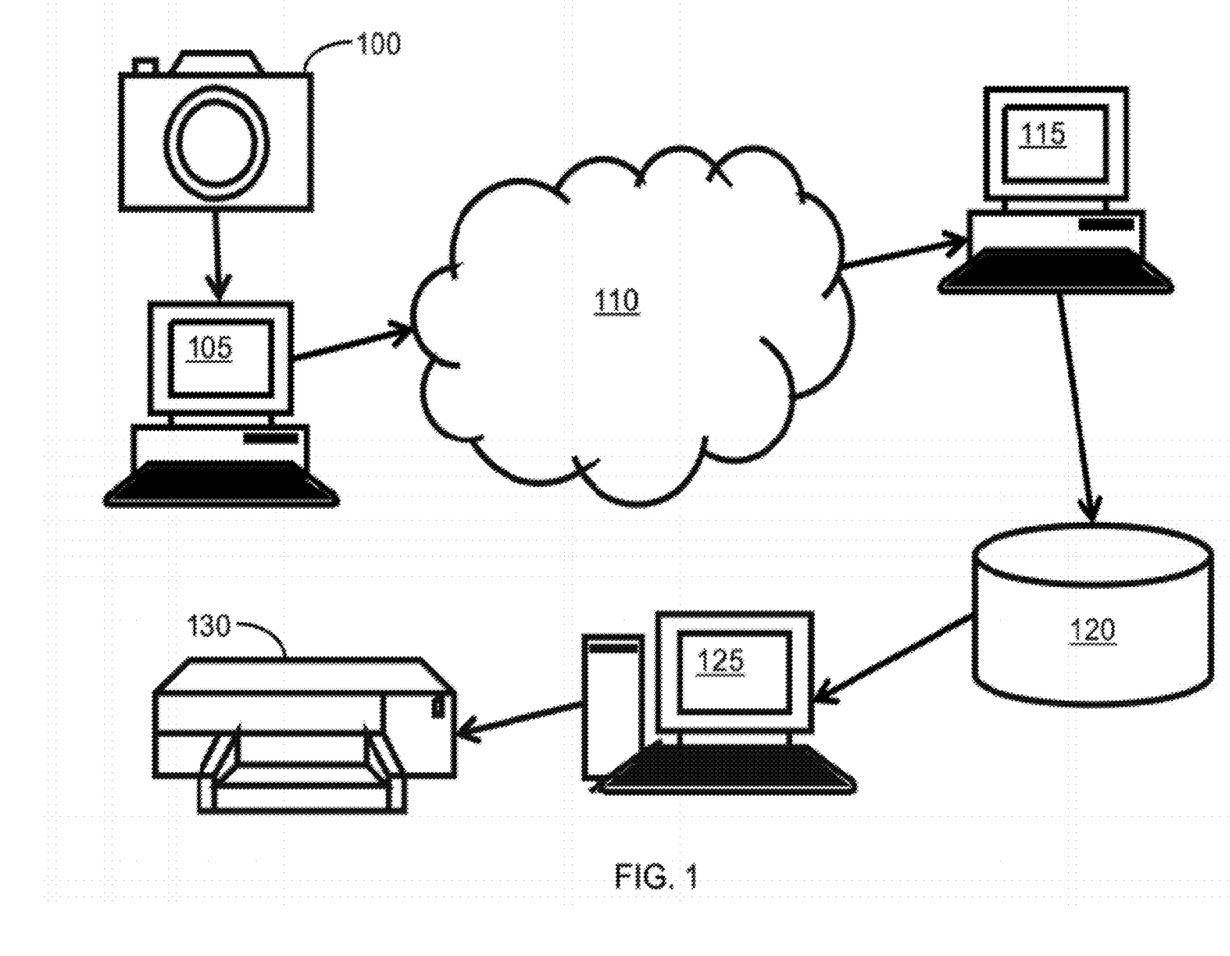
FIG. 1 is a diagram of an imaging system in which embodiments of the present invention find application.

The diagram in FIG. 1 is a schematic diagram of one kind of imaging system, which is known from the prior art. The same general system can be used according to embodiments of the present invention, though with different image enhancement processes being used, as will be described. According to FIG. 1, digital images are captured using a camera 100 and are downloaded onto a personal computer system 105. Selected images are then sent via a network 110, for example the Internet, to a computer 115 in a photographic printing laboratory. The computer 115 stores the images in a data store 120 in a print queue. The images are then retrieved by an imaging computer 125, which processes the images for example by applying an image sharpening filtering operation, and sends them to a printer 130 to be printed. The printed images are subsequently checked for quality—typically a manual process—and sent to the originator. The computers in this exemplary system all typically operate under a Microsoft Windows™ operating system; but could equally be operating under another operating system such as Mac Os™ or Linux™.

While the image processing is shown as being carried out on an imaging computer 125, it will be appreciated that some or all of the image processing could be carried out at other points in the system. For example, at least a part of the image processing could occur on the personal computer system 105, on the photographic laboratory computer 115 or even in the printer 130 itself, if provided with appropriate processing capability. Such processing could occur at any other appropriate point in this or any other appropriate system. For example, the image processing could even take place on the camera 100 itself.

While embodiments of the present invention are described in relation to image enhancement for printed images, they apply to image enhancement in general and, for example, could be applied (without limitation) to electronically displayed images, to be displayed on any kind of electronic display or projected onto a screen.

Figure 2:
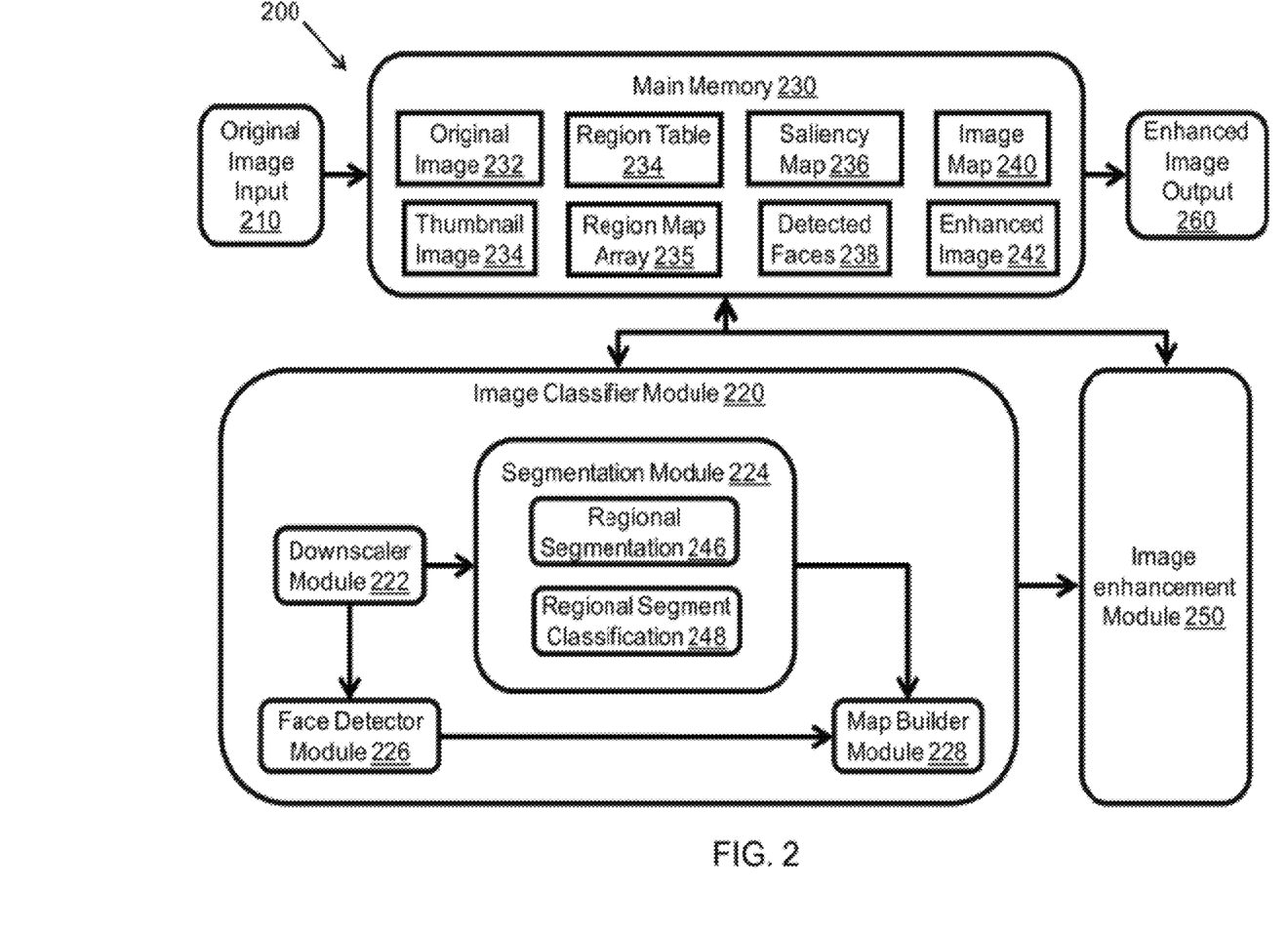
FIG. 2 is a diagram of an automated image processor according to an embodiment of the present invention.

An electronic image processor according to an embodiment of the present invention will now be described with reference to the functional module diagram in FIG. 2. The embodiment forms an image processing pipeline or elements thereof. The pipeline may comprise other elements (that are not shown for simplicity of understanding only), which may be upstream and/or downstream of the exemplified image processor.

According to the functional block diagram in FIG. 2, an electronic image processor 200 according to an embodiment of the present invention comprises: an original image input 210, which receives image data, for example in the form of a bitmap file (or any other appropriate file format); a main memory 230, which typically comprises RAM, for storing image data, data structures and variables employed in the various image processing operations, as will be described; an image classifier module 220, for generating an image map 240; an image enhancement module 250, for enhancing the image in one or more ways determined by the image map 240; and an enhanced image output 260. The input and output portions of the processor 200 receive an image from, and deliver an image to, respectively, upstream and downstream parts (not shown) of an overall image processing pipeline.

The image classifier module 220 according to the present embodiment comprises a number of functional modules, including a downscaler module 222, a segmentation module 224, a face detection module 226 and a map builder module 228, each of which will now be described in more detail.

Figure 3A:
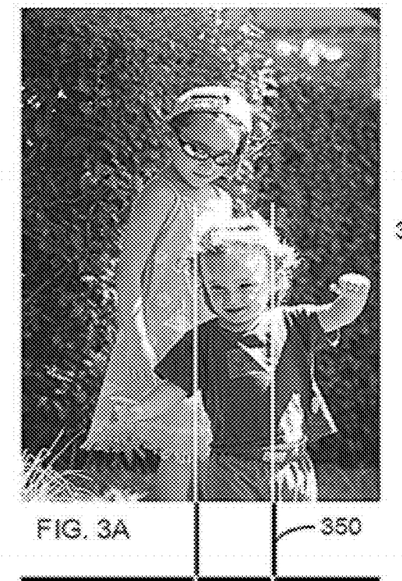
FIG. 3A depicts an exemplary original digital image, FIG. 3B graphically illustrates a saliency map of the image in FIG. 3A, FIG. 3C graphically illustrates a detected face map of the image in FIG. 3A and FIG. 3D graphically illustrates an image map comprising a combination of the outputs represented by the images in FIGS. 3B and 3C.

The downscaler module 222 operates on the received original image data, for example as shown in FIG. 3A, to downscale an image to a lower resolution. This function is optional, inasmuch as the processing could be carried out on a full resolution image with equal success. However, the subsequent processing of the image classifier module 220 is typically found to be much more efficient (i.e. faster), and no less accurate, if carried out on a downscaled image. The downscaler module 222 reduces the resolution of the original image to between 100 and 200 pixels on the longer side, using well known procedures, such as bilinear interpolation, to produce downscaled image (i.e. a thumbnail) 234, which is stored in main memory 230. According to the present embodiment, the aspect ratio of the original image is preserved in the down-scaled image.

The segmentation module 224 comprises a regional segmentation module 246 and a regional segment classification module 248, the purposes of which will now be described with reference to the flow diagrams in FIGS. 4A, 4B and 5.

Figure 4A:
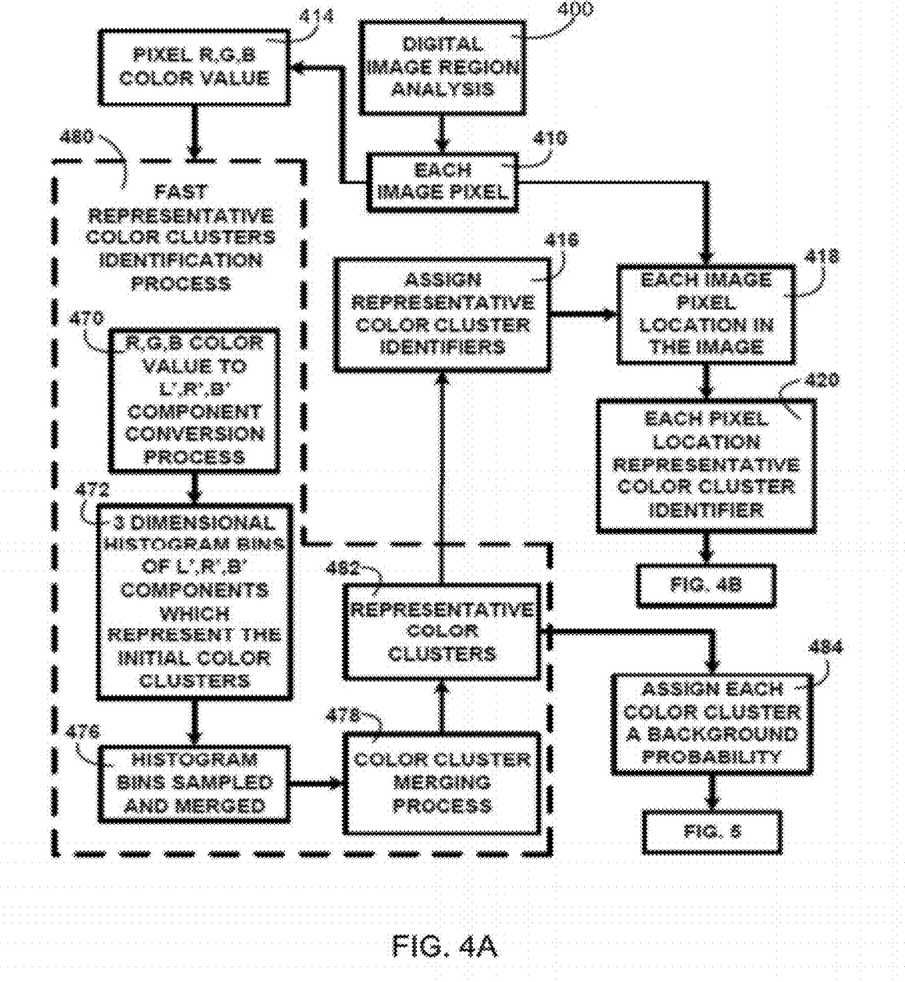
FIG. 4A is a graphical representation of a process flow of a regional segmentation module process of one embodiment of the present invention.

FIG. 4A shows a flow chart of a regional segmentation module process of one embodiment of the present invention. The regional segmentation module 246 in effect identifies regions of similarly coloured image pixels and defines them into regions. More particularly, the segmentation processes provides pixel by pixel analysis of the digital images, which enables faster and considerably more detailed evaluations of digital images for downstream processing. In general, numerous image colours are identified within a digital image (for example up to 65536 colours—for a 16-bit colour depth). A much smaller number of broad colour value clusters are selected for use in the analysis. Each pixel is then assigned to a representative colour cluster based on its own colour value. A 'cluster' is defined within the context of the image by similarly coloured pixels (within the broad colour value range) within an image. The pixels can be neighbouring or disconnected within the image, the rationale being that pixels of the same colour tend to relate to the same subject matter in the image.

Adjacent pixels of the same color cluster are then grouped into regional segments and classified as subject, background or distraction. The classifications are based on, for example, relative unusualness of the color, region size and location in the image. Classified regions form a saliency map 236. In effect, a cluster may be composed of plural regional segments, or 'regions', of connected or adjacent pixels.

A digital image region analysis 400 analyses each image pixel 410 once to determine the pixel R,G,B colour value 414 and each image pixel location in the image 418. In this context, a 'pixel' is the smallest sub-region of the downscaled image (e.g. for a downscaled image of 150×100 pixels, there are 15000 pixels to analyse).

In one embodiment a fast representative colour clusters identification process 480 first performs an R,G,B colour value to L',R',B' component conversion process 470, where L'=R+G+B, R'=R/L' and B'=B/L'. The fast representative colour clusters identification process 480 continues (see 472) to form 3-dimensional histogram bins of L',R',B' components which represent the initial colour clusters.

An example of an embodiment which is both computationally fast and reflects the perceptual significance of the colour space efficiently, is to use histogram bin widths in each of the 3-dimensions of L', R' and B', which are not equal in size or number. In one embodiment, the L' dimension is histogrammed using 14 bins of varying widths. R' and B' are sampled using a number of equally sized bins, however the number of bins used is different for each of the 14 L' bins.

L',R',B' components are then sampled and merged into other component bins (see 476). At the end of this histogramming stage, many of the histogram bins will typically be empty or contain very few pixel samples. Bins with few samples are merged into the non-empty bin with the most similar colour. The result of the process of histogram bins sampled and merged is a reduction in the number of colour clusters.

This is followed by a further colour cluster merging process 478 in which the colour clusters with the most similar colours are merged. This is repeated until the number of colour clusters has been reduced to a small number of distinct colours, for example 20, or the colour distance between the clusters with the most similar colours exceeds a threshold, for example 15.0 in the L*a*b* colour space.

The fast representative colour clusters identification process 480 produces representative colour clusters 482. The number of representative colour clusters 482 is much smaller than the number of colours in the original digital image of one embodiment of the present invention.

The fast representative colour clusters identification process 480 can be implemented very efficiently as each pixel in the original image is only accessed once. The process assigns a colour cluster background probability 484 to the representative colour clusters 482 in which large colour clusters and colour clusters close in colour to large colour clusters have a high background probability. For example, relatively high background probabilities may be assigned to large regions of green (e.g. grass or foliage), blue (e.g. water or sky) or yellow/brown (e.g. earth or sand), without a large degree of image processing. These and other relatively simple heuristics can be applied to assign a background cluster probability to all clusters of the image. According to the present embodiment, each cluster is assigned a background cluster probability in the range 0 to 255; though, in principle, it might be any other convenient range.

Figure 5:
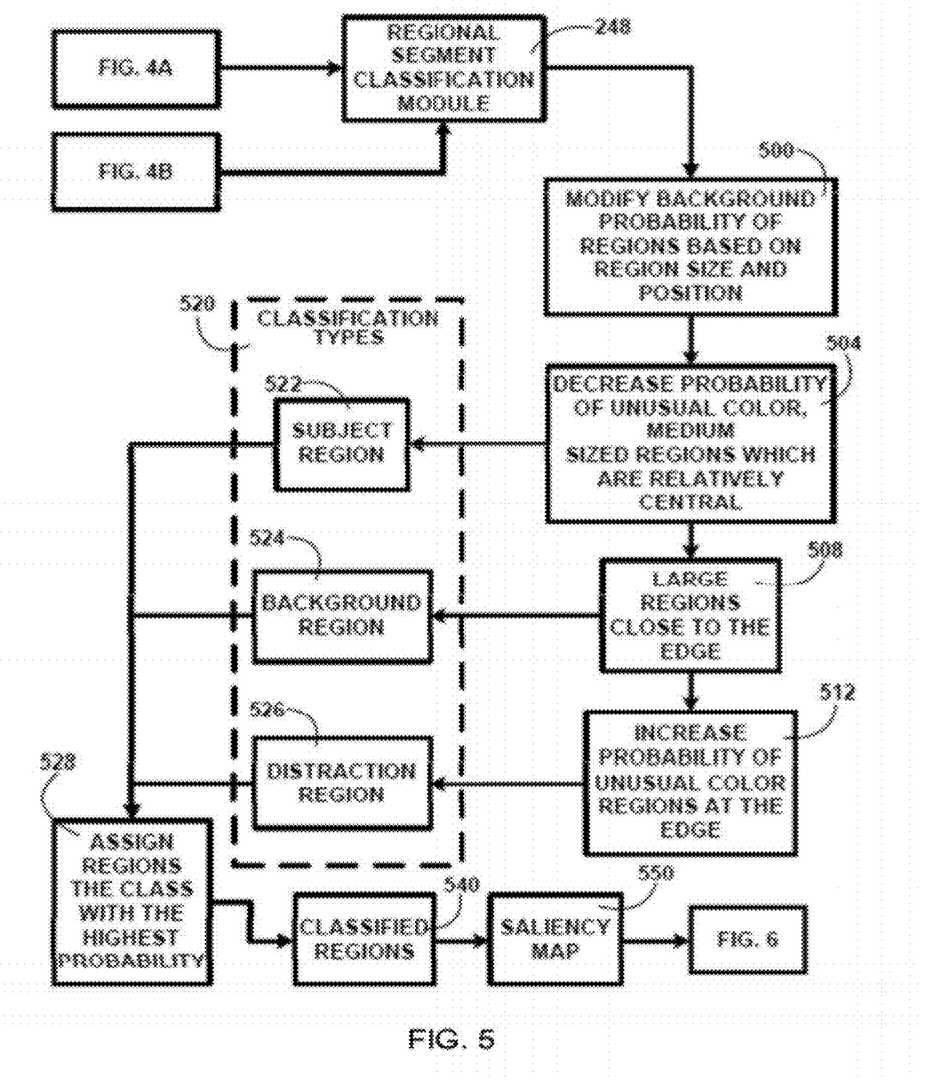
FIG. 5 is a graphical representation of a process flow that resumes the process depicted in FIGS. 4A and 4B and illustrates a regional segmentation classification module process of one embodiment of the present invention.

The colour cluster background probability assigned by process 484 is utilized in the classification of the regions as described in FIG. 5.

In a parallel operation, the regional segmentation module 246 proceeds to assign (see 416) representative colour cluster identifiers to each image pixel location in the image 418; whereby each pixel belongs to a cluster according to the identifier. Each pixel location representative colour cluster identifier 420 is processed further in FIG. 4B as will now be described.

Figure 4B:
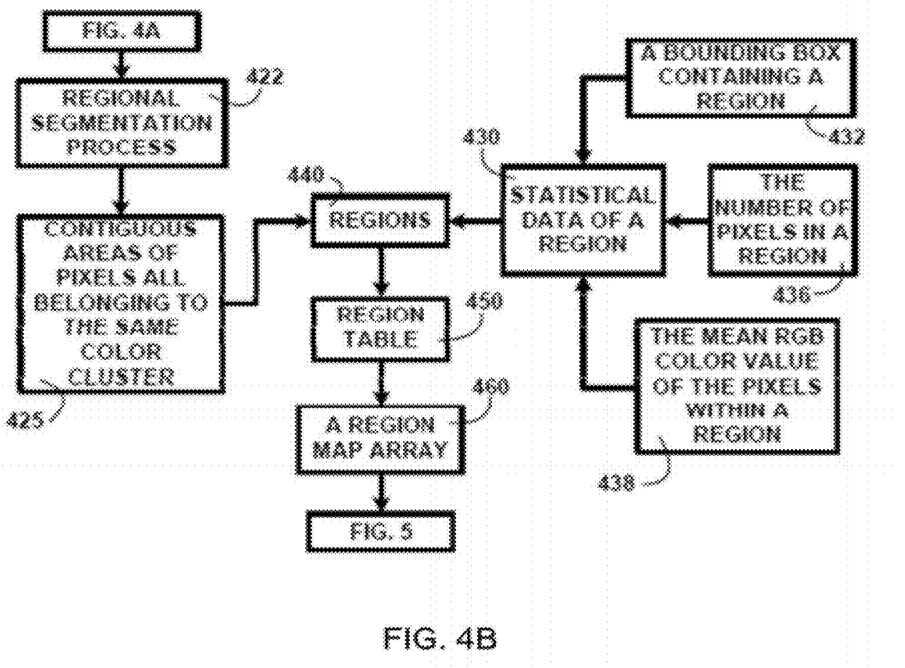
FIG. 4B is a graphical representation of a process flow that resumes the process depicted in FIG. 4A.

FIG. 4B shows a flow chart of a continuation of the regional segmentation module process. Now that each pixel location has an assigned representative colour cluster identifier 420, the regional segmentation process 422 groups contiguous pixels in the same colour cluster 425 into regions 440, whereby each cluster can contain one or more regions. According to the present embodiment, on a rectangular (or square) pixel grid, two pixels are 'contiguous' if they share an edge in common, such that each pixel can be contiguous with a maximum of four other surrounding pixels. Contiguous pixels may, however, be defined in other ways. For example, in some embodiments, contiguous pixels may include, in addition, pixels that share a corner (or are diagonally adjacent to one another), such that each pixel can be contiguous with a maximum of eight other surrounding pixels.

Statistical data of a region 430, for example, including a bounding box containing a region 432, the number of pixels in a region 436 and the mean colour of the pixels within a region 438 are processed 450 into a region table 234, which is stored in main memory 230. The statistical data of all the regions 440 is processed 450 into the region table, which forms 460 a region map array 235 of the entire image region of one embodiment of the present invention, and which is also stored in main memory 230. The region map array 235 contains the regional segment information to be used for segment classification which follows, and is described in FIG. 5.

Figure 3B:
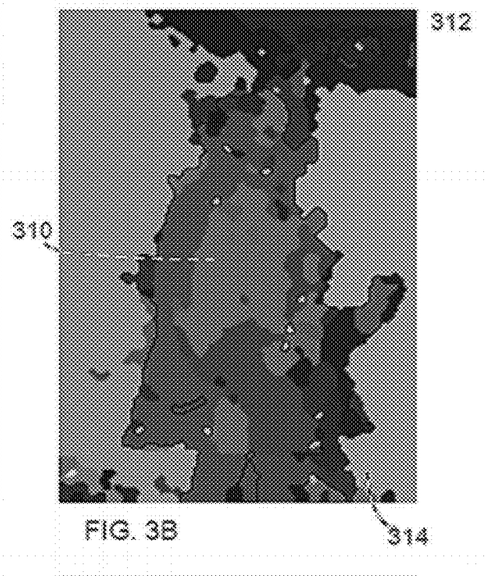

FIG. 3B graphically illustrates regions of adjacent pixels 310, 312 and 314 with similarly assigned representative colour clusters (though illustrated in greyscale for the present purposes).

In FIG. 5 the regional segment classification module 248 using the region map array 235 of FIG. 4C and the colour cluster background probability 484 of FIG. 4A proceeds to classify the regions 440 of FIG. 4C. The regional segment classification module 248 proceeds to modify (see 500) colour cluster background probability of regions based on various measures, such as region size and position and process the regions into classification types 520.

In general terms, the process uses the cluster background probability in conjunction with region context within the image (in this instance shape and position criteria relating to the region) to estimate three classification probabilities for the region; namely for whether the region is a subject, background or a distraction.

In a first, 'subject region' probability estimation 522, the starting point for deriving the probability that the region is a subject region, that is the 'subject region probability', is the inverse of the cluster background probability, which is (1−p) where p is the cluster background probability. This is modified according to appropriate position and shape heuristics.

Modification is by increasing the subject region probability if the region is more likely to be a subject region, and decreasing it if the region is less likely to be a subject region.

Region characteristics that tend to identify a salient photographic subject include, for example, unusual colour (relative to natural colours), for example bright colours, high contrast colours, etc. or medium sized regions which are relatively central. Other measures for identifying a subject can apply shape analysis, for example, to identify people, animals and vehicles, each of which can form the subject of photographs. Clearly, regions that closely match the criteria for a subject region will effectively have a greatly increased subject region probability as a result of the subject region probability estimation 522, whereas regions (e.g. nearer the edge of the image) that have only a few subject characteristics, will have a reduced subject probability. Embodiments of the invention are in no way limited to particular ways of identifying a subject.

In a second, 'background region' probability estimation 524, the probability that the region is a background region, that is the 'background region probability', is derived directly from the cluster background probability. In effect, the inherited cluster background probability for the region is increased or decreased depending on whether a region is deemed to be a background region. Characteristics of a background region, other than cluster size and colour (the primary factors influencing the cluster background probability), include whether the region is large and/or close to the edge 508 of an image. For example, regions that are relatively large will tend to have a relatively higher background region probability, with that probability increasing as the region is closer to the edge of the image. On the other hand; a relatively large region that has natural colours (indicating background), but is nearer to the centre, will have only a relatively lower background region probability, as a result of the background region test 524.

In a third, 'distraction region' probability estimation 526, as with the subject region probability, the starting point for deriving the probability that the region is a subject region, that is the 'distraction region probability', is the inverse of the cluster background probability, modified according to region position and shape based heuristics. Modification is by increasing or decreasing the distraction region probability depending on whether or not the region has the characteristics of a distraction.

According to the present embodiment, exemplary characteristics of a distraction are that the respective region is formed of unusual colours (relative to natural colours) and/or is located at the edge 512 of an image. The distraction region probability estimation 526 has the benefit of being able to identify regions that have a high 'subject' probability (e.g. due to unusual colour and size) but low perceived salience, for example, because the region is not central in an image. In effect, the distraction region probability estimation 526 greatly increases the degree of image understanding for the purposes of more accurate image enhancement. A distraction might, for example, be the brightly coloured clothing of a stranger who is accidently caught at the edge of an image. Such an image region would naturally and undesirably attract a viewer's attention without image processing according to embodiments of the present invention.

Overall, it will be appreciated that the three aforementioned region probability estimations derive respective region probabilities by increasing or decreasing the cluster background probability (or the inverse thereof, as the case requires) by amounts related to (for example proportional to) the degree of certainty that a region does or does not match the respective probability estimations' heuristic criteria, in order to promote salient regions and relegate non-salient regions.

Next, each region is assigned 528 to one of the three classes, 'subject', 'background', or 'distraction', on the basis of which of the subject region probability, background region probability and distraction region probability has the highest value for the respective region. The process then uses 540 the classified regions to produce 550 a segmented image saliency map 236 according to one embodiment of the present invention, which map 236 is stored in main memory 230.

In summary, the regions are heuristically classified as "foreground", "background" or "distraction", based on relatively cheap to compute features of the segmented regions such as relative size, shape, unusual-ness of colour (relative to natural colours), and location of the region in the image. For example, strong foreground objects, which are most salient to a human viewer, tend to be reasonably large, with relatively unusual colour, and fairly central position. Background, on the other hand, which is least salient to a human viewer, tends to comprise large regions with the most common (e.g. natural) colours, especially when at the edge of the image. Distractions are salient by virtue of their colour, and the contrast with neighbouring regions, and tend to be relatively small and close to the edge of the image: such regions are likely to undesirably attract the human visual system.

Some embodiments of the invention may identify and employ additional or alternative classes of region. For example, one additional exemplary class is "ignore". Such a classification may be applied to various image features that are determined not to require individual attention and/or image processing. For example, the class of ignore may be applied to relatively small image flaws, caused by scratches or dust, which can be highly contrasting against a background. Alternatively the ignore class may simply be used for very small regions formed as artifacts of the region segmentation algorithm, which are below a minimum size considered significant for image enhancement. These image features should not be classed as subject or even distraction by virtue of their colour or location. Instead, any image processing applied to regions classed as 'ignore' can be the same as the processing applied to surrounding regions. Of course, other known image processing techniques for removing or reducing the impact of such imperfections can be applied upstream or downstream in an image processing pipeline. The skilled person would be able to define additional region classes on the basis of the description herein.

It will be appreciated that other embodiments of the present invention can apply alternative segmentation and saliency algorithms, for example as described in U.S. Pat. No. 7,133,571 or in: "A model of saliency-based visual attention for rapid scene analysis", L Itti, C Koch, and E Niebur, IEEE Transactions on Pattern Analysis and Machine Intelligence, 20(11), 1998. Such algorithms typically identify subject and background regions but not distraction regions.

In practice, embodiments of the present invention use the numeric probability values of the saliency map 236, derived according to the preceding description, for downstream image processing purposes. However, to assist with understanding herein, a saliency map 236, for an original image in FIG. 3A, is represented 'graphically' in FIG. 3B. The saliency map 236 in FIG. 3B identifies image portions as being 'subject', 'background' or 'distraction'. In FIG. 3B, the relatively darker regions 310 in the middle portion of the image correspond to the two children in the photograph in FIG. 3A: these regions are classed as 'subject'. The relatively dark region 312 in the upper right hand portion of FIG. 3B, although not easy to differentiate from the children, is classed as 'distraction' and the relatively lighter portions 314 on either side of the children are classed as 'background'.

Figure 6:
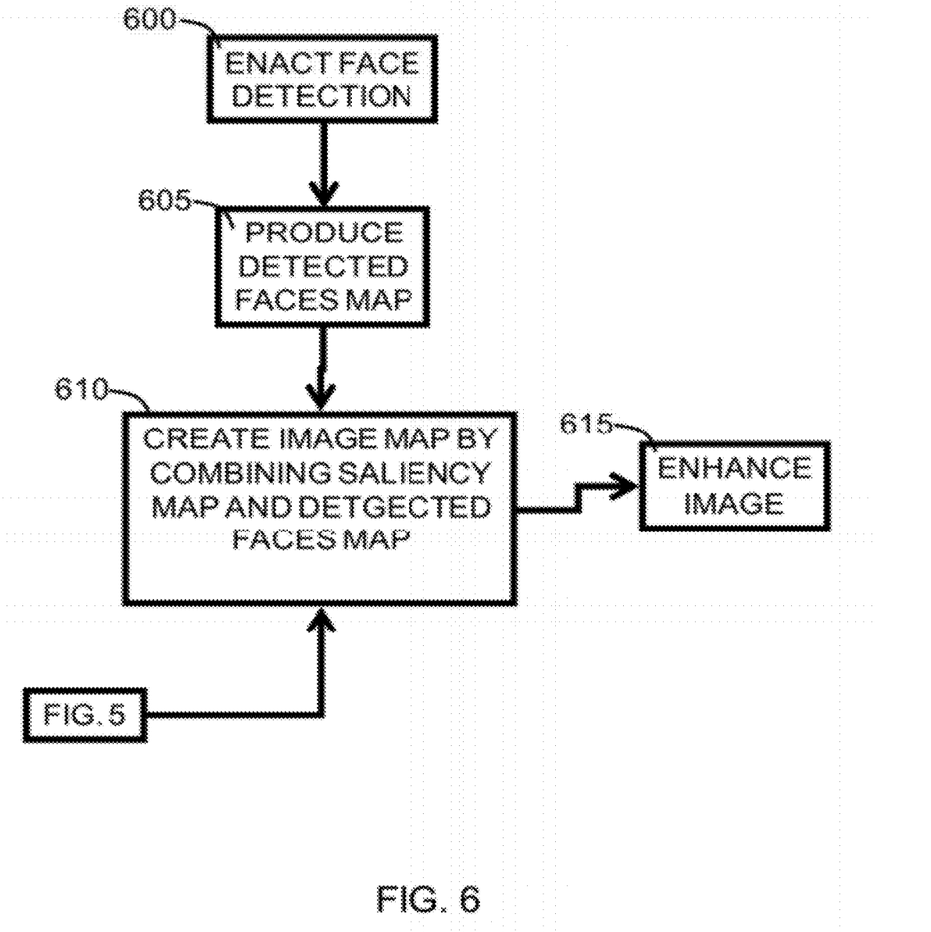
FIG. 6 is a graphical representation of a process flow that resumes the process depicted in FIG. 5 and illustrates the steps of detecting faces in an image and enhancing the image of one embodiment of the present invention.

As illustrated in the flow diagram in FIG. 6, the face detector module 226 enacts face detection 600 and identifies faces and skin to produce a detected faces map 238, which is stored in main memory 230. Again, the numeric probability values of the detected faces map are used in downstream image processing, and, for ease of understanding only, an exemplary detected faces map 238 is represented 'graphically' in the image in FIG. 3C.

Figure 3C:
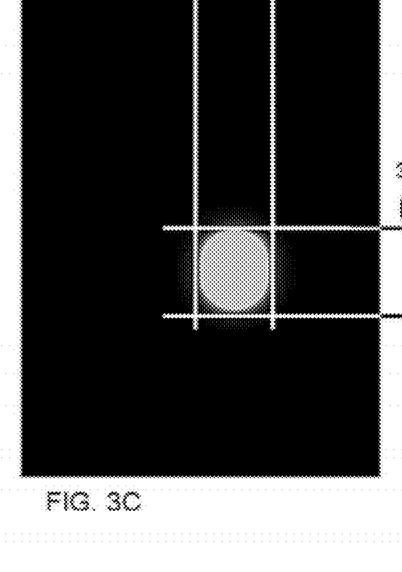

The detected faces map 238 assigns a value of between 0 and 255 to each pixel of the image, where 0 and 255 indicate certainty of not being a face and of being a face respectively, and values in between indicate varying degrees of probability. In the present example, a threshold of 80% is used, whereby pixel values above 204 (80% of 255) are deemed to be in a face and values of 204 and below are not. The face detector 226 may use known statistical face detection techniques—for example as applied in real time in certain models of digital camera to control the focus point in an image—and may equally be applied to embodiments of the present invention. A face detection algorithm suitable for application according to embodiments of the present invention is described in detail in US2008/0298704, the entire contents of which are hereby incorporated herein by reference.

In FIG. 3C, only the lower face of the smaller child has been detected, as emphasised by the parallel construction lines 350 that have been drawn between FIG. 3A and FIG. 3C. The taller child's face has not been detected (pixel values below 80% probability would have been determined), probably as the face is not sufficiently forwards-facing, and has not therefore been recognised as a face by the detection algorithm. Any suitable face detection algorithm may be used herein.

Known face detection algorithms can be reasonably accurate but can occasionally return false negatives (missed faces—as in the present example) and false positives (non-faces recognised as faces), which is why the present inventors have found it beneficial to apply image segmentation in addition to face detection. Also, many photographs do not contain people or faces, and it is still desirable to selectively enhance the subject differently from the background or distractions.

Figure 3D:
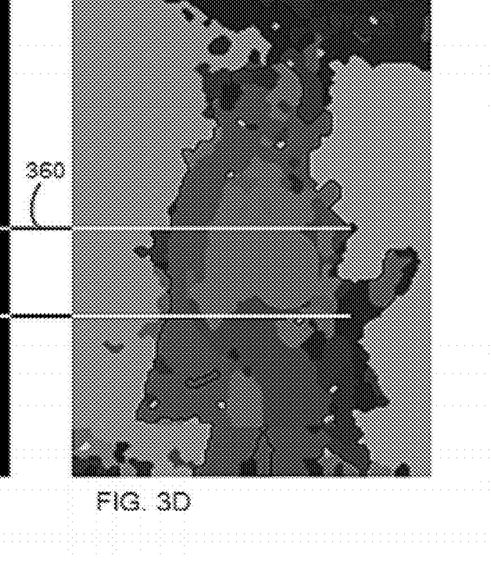

Referring back to FIG. 6, in effect, the map builder 228 creates 610 an image map 240 by combining the pixel data of the saliency map 236 with the pixel data of the detected faces map 238, using a simple maximum operator, as represented by the image in FIG. 3D.

It will be appreciated that embodiments of the invention are not limited to use of a maximum operator. For example, in other embodiments, the pixel data of the saliency map could be combined with the pixel data of the detected faces map using a different operator or function, for example a weighted average function.

The maximum operator, for each pixel, considers the respective subject region probability value in the saliency map 236 and the respective probability value in the detected faces map 238 (representing confidence, or 'face probability', that the pixel is in a face). The higher value of the two, which equates to the greatest probability out of each, is selected as the resulting subject region probability. In many cases, the location in an image of a detected face will coincide with a subject region identified by the segmentation process, and the result of the maximum operator will either be a new subject region having the face location and probability (if the face probability is higher than the existing subject region probability), or no change (if the face probability is lower than the existing subject region probability). According to the present embodiment; however, because a detected face is assigned a probability of 255 (i.e. the highest probability), a detected face will almost invariably lead to a subject region having the face location and a respective (increased) probability.

In some cases, a detected face may coincide with, or overlap with, a background region or a distraction region. In such cases, the maximum operator will typically have the effect of increasing the subject region probability for the respective pixels to being greater than the existing background or distraction region probabilities. Accordingly, the pixels that coincide with a face would effectively then be reclassified, from their existing background or distraction region classifications, to being a subject region with the detected face probability.

It can be seen that FIG. 3D is a combination of the data in FIGS. 3B and 3C; with the detected face being emphasised by the parallel construction lines 360. Other than the detected face, it is evident that FIG. 3D is substantially the same as FIG. 3B. In this example, the detected face does not change in any significant way the portions of the image map that are defined as 'subject', as the face coincides with regions that were already classed as subject. However, the result is expected to be more marked in other image examples, particularly where a face coincides with background or distraction regions.

The image enhancement module 250 enhances 615 the original image using the image map 240 to determine what portions of the original image to enhance and to what degree. The enhanced image is stored in main memory 230. Degree of enhancement may be a little as 'no enhancement', and encompasses apparently negative alterations such as making an image region fuzzier or darker than it originally was, for example in order to de-emphasise regions.

According to embodiments of the invention, a relatively simple 'sharpening' algorithm can be applied to the original image, on the basis of the image segmentation (subject/background/distraction). Suitable sharpening algorithms, which are well known, include any type of spatial sharpening filter, including but not limited to an unsharp-masking filter, a high-pass filter, a high boost filter, a differences of Gaussians based filter, and a Laplacian of Gaussian filter. In some embodiments, the image enhancement process is a non-linear smoothing and sharpening filter that combines generalised unsharp-masking, as described in US2008/0298704.

According to the present embodiment, a multi-scale enhancement algorithm is applied to sharpen the original image, using the image map 240 at each level (i.e. resolution) of the hierarchy of the enhancement algorithm. A suitable multi-scale enhancement algorithm for this purpose is described in US2009/0034864, the entire contents of which are hereby incorporated herein by reference. The image map 240 in effect modifies the image enhancement activity of the algorithm at each resolution in the multi-scale enhancement algorithm. In particular, according to the present embodiment, subject regions are sharpened (where degree of sharpening is in proportion to the difference between the image map probability value (0 . . . 255) and the mid value (128)). On the other hand, background and distraction regions are made softer (by reduced sharpening), again in proportion to a pixel's value relative to the mid value. More particularly, according to the present embodiment: at low-resolution levels in the hierarchy, the effect is to reduce the local contrast and dynamic range of background and distraction regions, and increase it for subject regions; and at higher-resolution levels in the hierarchy, the effect is to decrease the sharpness of background and distraction regions and increase it for subject regions. The overall effect is to emphasise subject regions, such that a human viewer is more attracted to the subject areas, and de-emphasise background and distraction regions, such that the viewer is less distracted by the background and distractions, in order to generate an image that is aesthetically more pleasing to a the viewer.

There are many known image enhancement algorithms that can be used according to embodiments of the invention. For example, as described above, it is possible to increase the sharpening in subject regions, and decrease sharpening in background or distraction regions. There are many other possibilities, for example: applying denoising (smoothing), with more denoising in the background; modifying local contrast, increasing local contrast enhancement in subject regions and decreasing local contrast in background or distraction regions; adjusting colour hue and/or saturation, with more saturation in subject regions and less saturation in other regions; undertaking local lightening and/or darkening; 3-D boosting, to make subjects appear to stand out from the rest of the image and/or provide greater apparent depth to objects such as faces; etc.

Even more generally, practically any enhancement algorithm can be used if it can be applied selectively and in terms of different strengths across an image according to the subject/background/distraction segmentation (or, indeed, any other segmentation according to embodiments of the invention), so as to try and increase the artistic saliency of the subject and hopefully to improve the artistic qualities of an image. In any event, typically, enhancement will tend to be more active (for example, lighter, higher contrast and/or colour saturation, sharper) for subject regions and less active (for example, darker, lower contrast and/or colour saturation, softer) for other regions. Of course, the actual mechanics of a per-pixel variation in control parameter depends on the control parameter and how it behaves. In some cases, a control parameter may be multiplied by a modified version of a map value, for example:

control=control*(map/128)

Alternatively, a normalized and scaled version of a map value can be added:

control=control+scale*((128−map)/128)

In this case, the modification depends on what kind of particular change in control parameter is desired. In most cases, however, such modifications will tend to be made on a per-pixel basis based on a local map value.

It will be appreciated that image enhancement may depend on one or more other factors, where such factors might influence upstream or downstream image enhancement, or may influence the application of the algorithms described herein. For example, a sky (background) region may be made bluer, or the appearance of wrinkles in a face (subject region) may be reduced by locally reducing contrast on skin regions. Many other known image processing techniques may be applied in combination with the techniques described herein.

The above embodiments are to be understood as illustrative examples of the invention. Further embodiments of the invention are envisaged. It is to be understood that any feature described in relation to any one embodiment may be used alone, or, if the context permits, in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An electronic image processor, comprising:
a memory storing processor-readable instructions; and
a data processor coupled to the memory, operable to execute the instructions, and based at least in part on the execution of the instructions operable to perform operations comprising
receiving digital image pixel data of an image to be enhanced;
identifying and classifying regions in an image, including assigning to each region one of plural predetermined classifications and a respective degree of confidence in the classification, on the basis of the context of the region within the image, each classification being associated with a perceived degree of saliency of the region to a human viewer of the image, wherein the classifying comprises determining for each region a classification probability for each predetermined classification, and assigns to each region a region probability comprising the highest classification probability, and
enhancing regions of the image by a degree of enhancement determined at least in part by the respective classification and by the degree of confidence in the classification.

2. The image processor of claim 1, wherein based at least in part on the execution of the instructions, the data processor is operable to perform operations comprising producing a thumbnail of the image from the image data, and the identifying and classifying are performed on the thumbnail.

3. The image processor according to claim 1, wherein the predetermined classifications include subject, background and distraction.

4. The image processor according to claim 1, wherein the classifying comprises identifying clusters of similarly coloured pixels within the image and assigns a cluster background probability to each cluster on the basis of its context within the image.

5. The image processor according to claim 4, wherein the context includes the colour and size of a cluster relative to other identified clusters in the image.

6. The image processor according to claim 4, wherein the classifying comprises identifying regions comprising adjacent pixels within each cluster and initially assigns to each region a region probability based on the background probability of the cluster to which the region belongs.

7. The image processor according to claim 6, wherein the classifying comprises adjusting the initial region probability for each region on the basis of determined characteristics of the region in the context of the image.

8. The image processor according to claim 1, wherein the classifying comprises identifying different regions of the image and their respective degrees of confidence, and a face detector module to identify faces in the image and their respective degrees of confidence.

9. The image processor according to claim 8, wherein the classifying comprises producing an image map, representing for each pixel of the image a region classification and an associated degree of confidence in the region classification.

10. An electronic image processor, comprising
a memory storing processor-readable instructions, and
a processor coupled to the memory, operable to execute the instructions, and based at least in part on to execution of the instructions operable to perform operations comprising:
receiving digital image pixel data of an image to be enhanced;

identifying and classifying regions in an image, including assigning to each region one of plural predetermined classifications and a respective degree of confidence in the classification, on the basis of the context of the region within the image, each classification being associated with a perceived degree of saliency of the region to a human viewer of the image, wherein the classifying comprises     identifying different regions of the image and their respective degrees of confidence, and a face detector module to identify faces in the image and their respective degrees of confidence,     producing an image map, representing for each pixel of the image a region classification and an associated degree of confidence in the region classification, and     determining for pixels of the image map that coincide with a detected face, a subject region probability according to the greater of a subject region probability determined by the segmentation module and a face probability determined by the face detector module; and enhancing regions of the image by a degree of enhancement determined at least in part by the respective classification and by the of confidence in the classification.

11. The image processor according to claim 1, wherein the enhancing comprises applying to pixels of at least one region at least one local enhancement, wherein the degree of enhancement is related to the perceived degree of saliency, and wherein the local enhancement includes at least one of sharpening, softening, lightening, darkening, increasing/decreasing contrast and altering colour hue and/or saturation.

12. The image processor according to claim 1, wherein the enhancing comprises applying a multi-scale enhancement algorithm to the image to be enhanced, wherein the degree of enhancement applied to at least one region at each level of enhancement is determined at least in part by the respective region classification and by the respective degree of confidence in the classification.

13. A method comprising:

receiving digital image data of an image;

classifying identified regions of the image according to one of plural predetermined classifications and associated degrees of confidence in the classifications, on the basis of the context of the region within the image, each classification being associated with a perceived degree of saliency of the region to a human viewer of the image, wherein the classifying comprises determining for each region a classification probability for each predetermined classification, and assigns to each region a region probability comprising the highest classification probability; and enhancing regions of the image by a degree of enhancement determined at least in part by the respective classification and by the degree of confidence in the classification.

14. A non-transitory computer-readable medium having computer readable instructions stored thereon for enacting a process according to the method of claim 13.

* * * * *

UNITED STATES PATENT AND TRADEMARK OFFICE
CERTIFICATE OF CORRECTION

PATENT NO.         : 8,594,439 B2                                       Page 1 of 1
APPLICATION NO.    : 13/320963
DATED              : November 26, 2013
INVENTOR(S)        : Carl Staelin et al.

It is certified that error appears in the above-identified patent and that said Letters Patent is hereby corrected as shown below:

In the Claims

In column 13, line 25, in Claim 10, delete "of" and insert -- degree of --, therefor.

Signed and Sealed this
Fifteenth Day of April, 2014

Michelle K. Lee
*Deputy Director of the United States Patent and Trademark Office*